United States Patent [19]
Wilcox

[11] 3,708,949
[45] Jan. 9 1973

[54] METHOD AND APPARATUS FOR DETECTION OF LEAKS IN SEALS OF PACKAGES

[75] Inventor: Burdsal G. Wilcox, Oakland, Calif.

[73] Assignee: Safeway Stores, Incorporated, Oakland, Calif.

[ * ] Notice: The portion of the term of this patent subsequent to July 13, 1988, has been disclaimed.

[22] Filed: Oct. 9, 1970

[21] Appl. No.: 79,552

Related U.S. Application Data

[63] Continuation-in-part of Ser. No. 803,798, March 3, 1969, Pat. No. 3,591,944, which is a continuation-in-part of Ser. No. 796,460, Feb. 4, 1969, abandoned.

[52] U.S. Cl...........................53/53, 53/78, 53/112 A
[51] Int. Cl..........................B65b 57/00, B65b 31/02
[58] Field of Search.................53/22, 78, 112, 53, 65; 73/40.7, 45, 49.3, 45.2

[56] References Cited

UNITED STATES PATENTS

| | | | |
|---|---|---|---|
| 2,922,519 | 1/1960 | Radley | 53/53 X |
| 3,035,380 | 5/1962 | Leavens | 53/65 X |
| 3,359,702 | 12/1967 | Beert et al. | 53/53 |
| 3,591,944 | 7/1971 | Wilcox | 53/22 A |
| 3,592,049 | 7/1971 | Johanski | 53/53 X |

*Primary Examiner*—Travis S. McGehee
*Attorney*—Hill, Sherman, Meroni, Gross & Simpson

[57] ABSTRACT

A machine for forming and testing sealed packages from heat-sealable packaging materials employs an apparatus for forming individual packaging trays for receiving the product to be packaged from a first continuously fed web of heat-sealable flexible packaging material. A second continuously fed web of heat-sealable packaging material is directed along a path parallel to the path of the first web and is partially heat-sealable thereto to package the product. After partial sealing, each of the serially connected train of packages is connected in fluid communication with means for evacuating the ambient atmosphere therefrom and replacing the ambient atmosphere with a preservative atmosphere. The package is then sealed to prevent escape of the preservative atmosphere and transported along the machine, still in the package train, to automatic inspection apparatus.

The inspection apparatus provides a first section for detecting leaks in the individual packages and a second section for marking defective packages. The sensing section includes a pressure chamber for each individual package and means for sensing gas of the preservative atmosphere or a tracer gas portion of the preservative atmosphere should the inspected package be leaking such gas and to develop a control signal when gas leakage is detected. The marking section includes apparatus for marking a defective package received from the sensing section An electrical control circuit extends between the sensing and the marking section to provide operative control of the marking apparatus at a delayed time which permits the travel of a package from the sensing section of the packaging machine to the marking section of the machine.

After inspection, the packages are separated and the unmarked packages are then prepared for shipment while the marked packages are diverted so that their products may be repackaged. Inasmuch as the packages may be scuffed or in other ways have the integrity of their seals weakened or broken, for example the package material may be burned by labelling techniques, the packages are placed in an overwrap carton and the carton is subjected to another pressure test prior to sealing whereupon detection of the preservative atmosphere will signal that the carton contains a leaky package or packages. Cartons containing only sealed packages may then be further packaged for shipment and cartons containing leaky packages may be diverted for testing of the individual packages.

10 Claims, 12 Drawing Figures

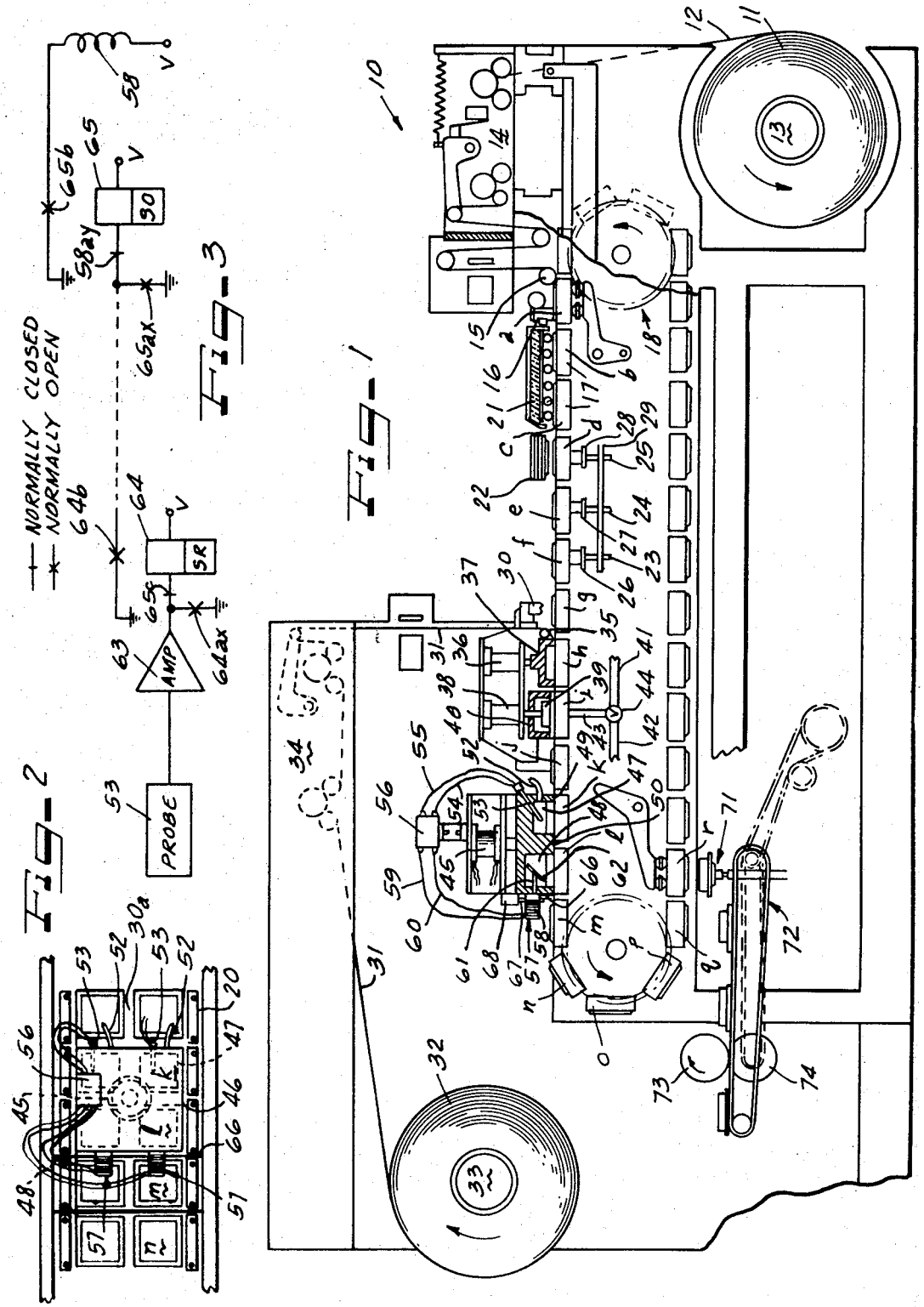

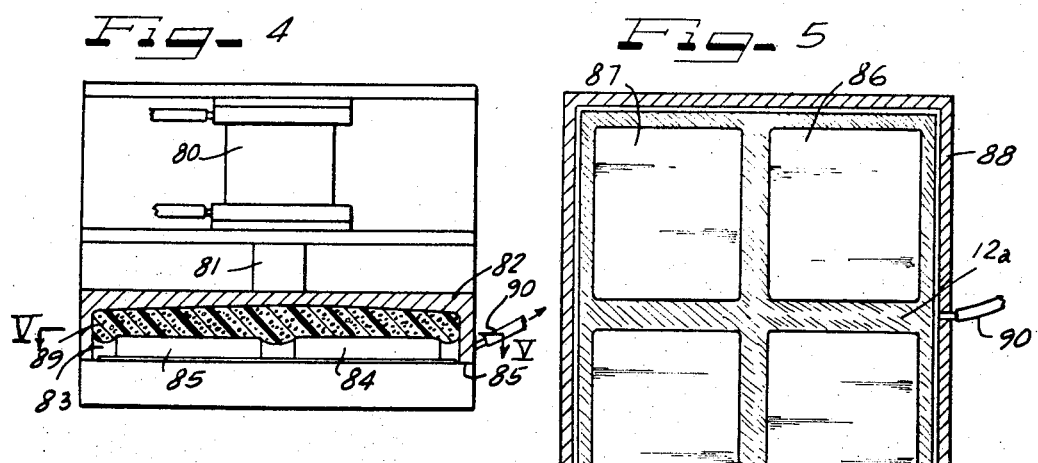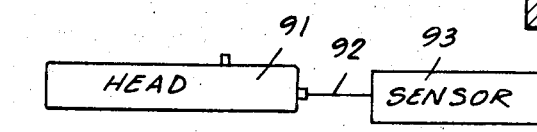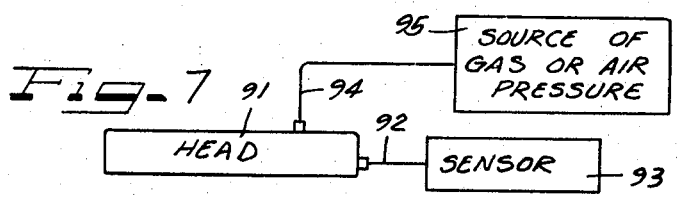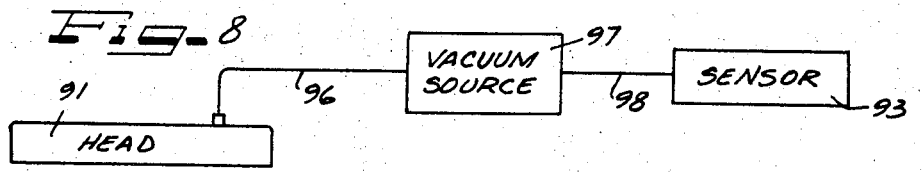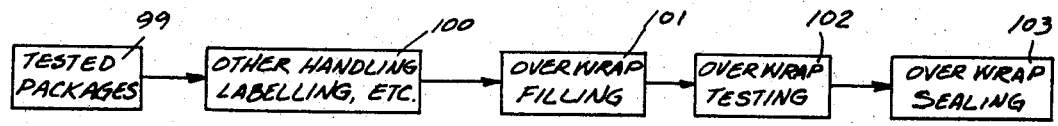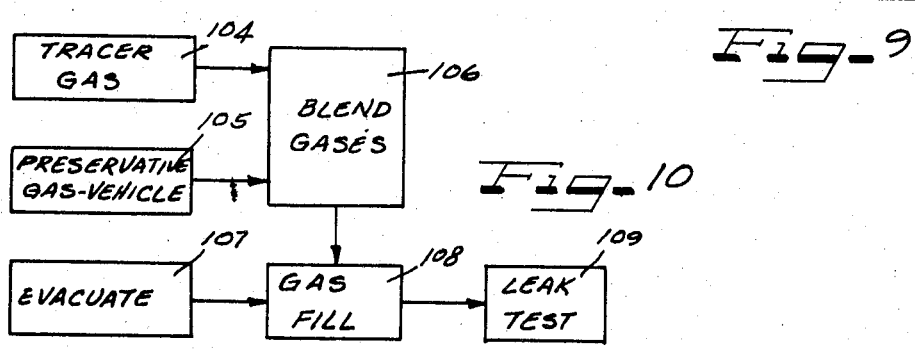

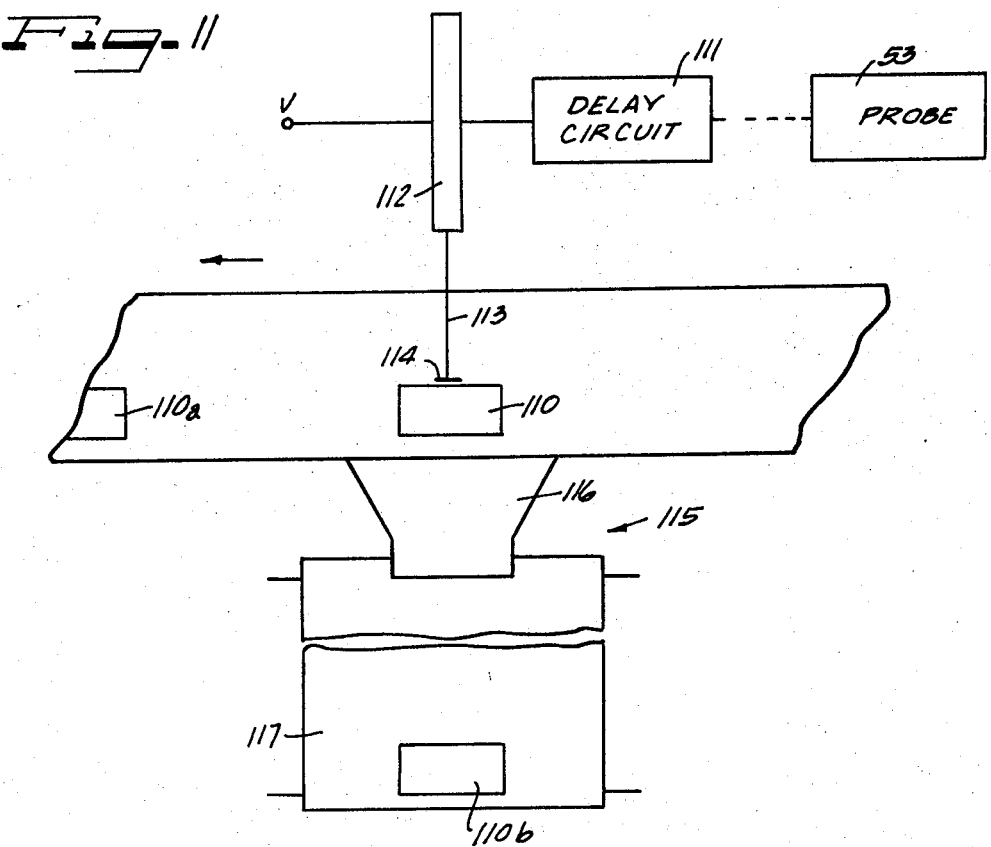
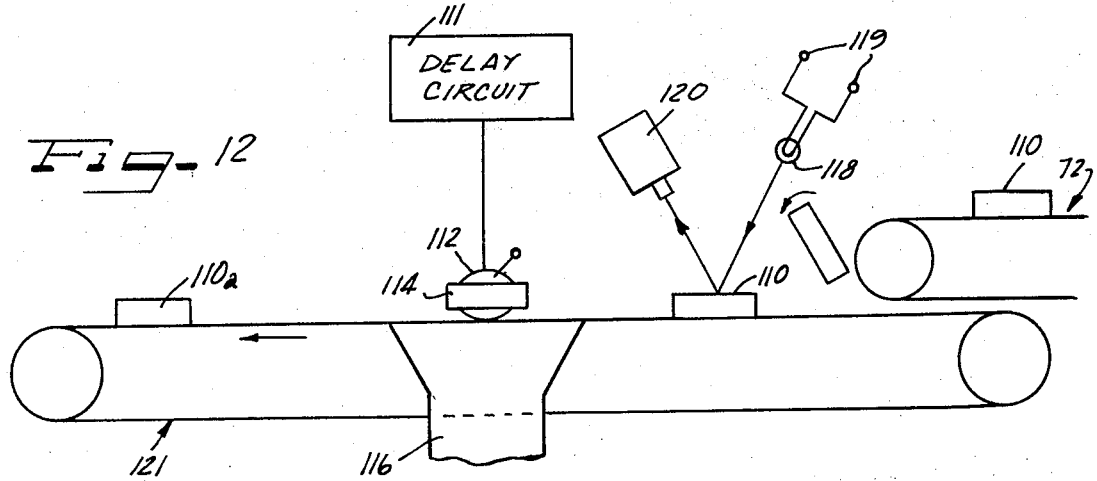

METHOD AND APPARATUS FOR DETECTION OF LEAKS IN SEALS OF PACKAGES

CROSS REFERENCE TO RELATED APPLICATIONS

This application is a continuation in part of my application of the same title, Serial No. 803,798 filed Mar. 3, 1969, now U.S. Pat. No. 3,591,944, issued July 13, 1971, which was a continuation in part of my prior application of this same title, Ser. No. 796,460, filed Feb. 4, 1969. and now abandoned.

BACKGROUND OF THE INVENTION

1. Field of the Invention

This invention relates to packaging apparatus and to methods of forming sealed packages, more particularly to apparatus and methods for automatically packaging products in individual packages between sheets of heat-sealable packaging material, the resulting package being insured against leakage by providing a preservative atmosphere therein and automatically detecting for leakage of the preservative.

2. Description of the Prior Art

The prior art recognizes many method and apparatus for automatically packaging products including methods and apparatus for forming packages from heat-sealable flexible packaging material having a characteristic which provides a low rate of gas permeability, particularly with respect to oxygen. Packages made from materials which possess such a characteristic have found wide acceptance in the food packaging area because of the extended shelf life afforded to the packaged product of which certain packaged meats, cheeses, nuts and dried fruits have particularly benefited from such packaging in that these food products are protected from atmospheric oxygen.

The prior art also recognizes that a vacuum package, such as described above, may be damaged or its product may be damaged due to the pressure differential at the package walls; therefore, it is known to provide an inert gas such as nitrogen or carbon dioxide after evacuation of the package in order to reduce or eliminate this pressure differential, and accordingly overcome this disadvantage.

Present vacuum and gas packaging equipment is designed to insure wrinkle free sealing of the package walls since wrinkles in these areas are undesirable in that they may prevent proper package sealing and lead to leakage prior to expiration of a predetermined period of normal package life expectancy. Although steps are taken to avoid wrinkles, leakage does occur as a result of a number of factors including undetected ruptures in the package material such as minute slits. Inasmuch as inspection of the package has heretofore been visually performed, these ruptures have escaped detection and the defective packages have gone undetected. It is therefore desirable, and a primary object of the present invention, to provide packages from heat-sealable flexible packaging material which are absolutely free of the leakage problem.

Apparatus for testing the integrity of packages is also known in the art. Such apparatus has heretofore taken the form of a machine which is separate from packaging operation. It is therefore also highly desirable, and another object of the present invention, to provide packaging and testing operations in a single machine. Prior testing apparatus is capable of receiving and testing only previously separated packages making it necessary to include a separating operation in the packaging machine and handling of individual packages. Another object of the invention is to provide a method and apparatus for forming and testing serially connected trains of packages as they are stepped through a single packaging machine.

SUMMARY OF THE INVENTION

Briefly, the present invention provides methods and apparatus for forming packages from heat-sealable flexible packaging materials by passing a first continuous web of packaging material over tray forming apparatus to provide a plurality of attached receptacles for receiving the product to be packaged. After receiving the product the first web including the trays formed therein and a second continuous web of packaging material are directed in a stepped fashion along paths parallel to each other to heat sealing apparatus whereat the individual trays of the first web are covered by and sealed to the second web. The ambient atmosphere is then evacuated from the packages and a preservative atmosphere, such as nitrogen and/or carbon dioxide, or carbon dioxide and a food compatible tracer gas such as octafluorocyclobutane, is introduced therein to provide a series of individual but joined gas filled packages which are stepped in turn to an inspection station.

The inspection station comprises individual chambers for the packages, means for providing a pressure within the chamber that is at variance with the pressure within the packages, and gas detection apparatus for detecting leakage of the preservative atmosphere from the package. The gas detecting apparatus may be realized through the utilization of a M-S-A LIRA Model 300 Luft-type Infra Red Analyzer available from the MSA Instrument Division of the Mine Safety Appliance Company, which analyzer is capable of detecting as little as 200 ppm $CO_2$. In the case of detecting octafluorocyclobutane as tracer-gas, halogen leak detecting apparatus, such as the halogen leak detection control unit, catalogue no. 50–420100FAFF, and a type H–2 gun-type probe, catalogue no. 50–420202ABGF, available from the General Electric Co., or an equivalent, may be employed. This particular apparatus has a sensitivity of detecting halogen leakage of 0.001 ounces/year. Inasmuch as octafluorocyclobutane is relatively expensive and as extremely sensitive apparatus is available for detecting extremely small amounts thereof, one preservative atmosphere which may be employed in the present invention includes the use of $CO_2$ as a vehicle for octaflurocyclobutane which is employed as a tracer gas. A mixture of these gases may be provided by a gas blender of suitable design, such as gas blenders manufactured by Air Products & Chemical Company, Specialty Gas Division. The detecting means includes apparatus for translating detection of the preservation into an electrical control signal. The inspection station further comprises apparatus downstream from the sensing apparatus for marking defective packages in response to the control signal.

A time delay circuit is provided between the translating apparatus and the marking apparatus, the delay interval of which corresponds to the travel time of a package as it is stepped from the sensing probe to the marking apparatus. The joined packages, including any defective packages, are transported to a station where the packages are separated, after which inspection requires only observation for marked packages.

The invention further considers the utilization and performance of another leakage test. This additional test is concerned with those packages which are found to be free of defective seals, but which have undergone additional processing or packaging prior to shipment. For example the conventional techniques for securing labels to packages by heat sealing may effect ruptured or weakened areas of the packages. Likewise, an inadvertent scuff or abrasion may also give rise to a seal defect. Therefore, upon placement of groups of packages in an overwrap package, and prior to sealing of the overwrap package, the entire overwrap package is subjected to detect if it contains any leaky packages.

BRIEF DESCRIPTION OF THE DRAWINGS

The above and other objects and features of the invention, its organization, construction and operation will be best understood from the following detailed description of exemplary embodiments thereof taken in conjunction with the accompanying sheets of drawing, in which:

FIG. 1 is an elevational view, shown partially in cross-section, of an automatic packaging machine constructed in accordance with the principles of the present invention;

FIG. 2 is a fragmentary top view of a portion of the machine illustrated in FIG. 1 showing in particular the automatic inspection station of the machine; and FIG. 3 is a schematic illustration of one of the time delay circuits which may be employed in the present invention;

FIG. 4 is an elevational view, shown partly in cross-section, which illustrates another version of the inspection station according to the present invention;

FIG. 5 is a sectional view taken along the line V—V of FIG. 4;

FIGS. 6, 7 and 8 are schematic representations of various relationships between the inspection head, gas analyzers and pressure apparatus of the present invention;

FIG. 9 is a diagram showing further processing of the packages after individual inspection and testing of the integrity of their seals;

FIG. 10 is a flow chart relating to the evacuation and filling of packages, the filling being provided from a source of blended gases;

FIG. 11 is a top of a portion of the automatic packaging machine of FIG. 1 schematically illustrating the provision of a mechanism for rejecting defective packages; and FIG. 12 is an elevational view of a portion of an automatic packaging machine of FIG. 1 shown adaptive for rejecting defective packages through the utilization of a photoelectroc pick up device.

DESCRIPTION OF THE PREFERRED EMBODIMENTS

Inasmuch as a construction of the present invention may take the basic form of the packaging machine disclosed in U.S. Pat. No. 3.061,984, the following description is directed toward such a machine and the disclosure of the just-mentioned reference is understood to be fully incorporated herein.

Additionally, it is known in the art that sealed packages may be formed in straight line type machines from a single web wherein means are provided for folding the web about a product, and also by sealing a single web to a plurality of preformed trays wherein, contrary to the tray formation description below, means are not necessary for tray formation.

In the drawings, a packaging machine is generally shown at 10 as comprising a roll 11 of heat-sealable flexible packaging material 12 which is mounted for unwinding on a rotating shaft 13. The web 12 is drawn from the roll 11 into the machine by a powered material drawing unit 14 which forms a plurality of service loops therein and operates to draw the web 12 in a stepped fashion. The web 12 is passed under an idler roller 15 and web guides 16, and then directed parallel to and at the same stepped rate as a plurality of packaged forming trays 17. Trays 17 form an endless chain about a pair of roller apparatus 18 and 19. The trays 17 and the rollers apparatus 18 and 19 are, of course, powered by indexing apparatus (not shown) to move intermittently permitting resting intervals adequate to perform the packaging steps at individual functional positions along the path defined thereby. The individual functional positions of significance are referenced $a, b . . . r$ for ease and clarity of explanation. A plurality of packages may be simultaneously processed transversely of the machine; however, only a single moving line of packages will be specifically described herein and by reference to the formation and testing of a single package (and packages longitudinally adjacent thereto) it being understood that transversely aligned packages are being identically processed. Mutual travel of the web 12 and the trays 17 is insured by a plurality of clamps 20 which are disposed along each edge of the web and operated by index-controlled lever apparatus as the web 12 passes over position $a$.

The clamped web 12 is then stepped to the next functional positions $b$ and then $c$ which form a heating station including a heating element 21 which is employed to elevate the temperature of the web 12 so that it is suitable for pressure forming at the following position, position $d$. The heated web is then stepped to position $d$ adjacent or beneath a conveyor or other type loading mechanism 22. Position $d$ and positions $e$ and $f$ further comprises a plurality of fluid connections 23, 24, and 25 and a corresponding plurality of gaskets 26, 27 and 28 which are individually coupled to a vacuum supply (not shown) and commonly coupled to an actuator 29 which provides a sequential-type presentation of vacuums to the individual trays thereabove. It has been found that as a vacuum is applied to the tray 17 above passageway 25 and gasket 28, material tends to flow from left to right as viewed in the drawing. However, it has been further discovered that the application of lesser vacuum levels via conduits 23 and 24 prior to application of the vacuum and conduit 25 tends to prevent such material flow during vacuum-forming of the individual cups. The material of the web 12 is therefore drawn down into the tray 17 to provide a plurality of cups for receiving products therein from the conveyor apparatus 22.

The partial package is then stepped to position g at which a knife 30 is moved downwardly to pierce the portion of the webs lying between the two transversely adjacent packages to form slits 30a. It is through these slits that the apparatus of the aforementioned U.S. Pat. No. 3,061,984 gains access to the interior of the packages for evacuation and gas filling thereof. It should be pointed out that while such apparatus is suitable for evacuating and gas filling the packages, the packages may be evacuated and gas filled by other means. For example, it is well known in the art to provide a weakened area along the seal of a package, the weakened area then being intentionally ruptured by means of an external vacuum for access to the interior of the package. A gas supply may then be placed in communication with the interior of the package through the ruptured area and the package then sealed in a gas filled state.

The tray containing the product is then stepped to position h for further processing. As the tray is traversing between positions g and h, a second heat-sealable flexible web of packaging material 31 is directed directly above and along the path of travel of web 12. The web 31 is supplied from a roll 32 of heat-sealable material which is mounted for unwinding on a shaft 33. The web traverses a path partially defined by drawing apparatus 34 and an idler roller 35. The idler roller 35 directs the web 31 to the top surface of web 12 covering the product contained in the tray 17 formed therein. Disposed above station h is an electromagnetic actuator 36 for moving a heated sealing member 37 into contact with web 31. Heater member 37 extends substantially, but not entirely, around the periphery of each tray, an area being left unsealed adjacent slit 30a. In this manner, the trays 17 of web 12 and the upper web 31 are transformed into partially sealed packages and a passageway is formed for later evacuation and gas filling. Actuator 36 then retracts heated element 37 and the partially sealed package is stepped to position i.

At position i an actuator 38 is employed to extend an element 39 against the upper surface of web 31 to force the web 31 downwardly so that the periphery of the tray thereunder is held firmly against the web 31 to seal the package from the atmosphere with the exception of the passageway formed via the slit 30a. The package is then evacuated, filled with a preservative gas and then sealed by the heated element 40.

The apparatus for evacuating and filling the package is symbolically illustrated by conduits 41, 42 and 43 which are interconnected by a valve 44. The conduit 41 is connected to a vacuum supply for evacuating the package; conduit 42 is connected to a supply of preservative gas for filling the package; conduit 43 is in full communication with the package and selectively with conduits 41 and 42; and valve 44 provides the selective connection between conduits 41, 42 and 43. A detailed description for suitable apparatus for performing the evacuation and gas filling of the packages may be found by reference to the aforementioned U.S. Pat. NO. 3,061,984.

After the package is sealed at position i, the package is stepped to position j. It will be appreciated that the packages are still joined both longitudinally and laterally of the packaging machine, the packages being stepped from position to position as a serially connected train of packages.

The sealed package is then stepped from position j to position k and then to position l. Disposed immediately above positions k and l is an actuator 45 including a movable element or head 46 having longitudinally thereof chambers 47 and 48 formed wherein with edges 49, 50 and 51 being disposed for sealing engagement with the top surface of web 31. Chamber 47 includes a passageway 52 communicating between the interior and exterior thereof for connection to a supply of vacuum. Vacuumization of chamber 47 produces a pressure differential between the interior and exterior of a package within chamber 47. Such a pressure differential will cause leakage of the preservative atmosphere from the interior to the exterior of a defective package, such leakage being detected by a gas detecting probe 53 or a tube via a vacuum pump to gas sensing apparatus. Probe 53 or other gas sensing apparatus is operable to generate an electrical signal and place the signal across conductors 54 and 55 for use in marking the defective package as it is stepped into position l.

Although the foregoing has discussed vacuumization of chamber 47 to effect a pressure difference across the thickness of the packaging material, other techniques may be employed. A physical mechanical contact force and/or a pressure from an external source of air or other gas pressure may be applied to the package to force leadage of the preservative atmosphere from the package. See, for example, FIGS. 4–7. However, in either case gas leakage of the preservative atmosphere is detected by gas analyzing apparatus and a leak detection signal is generated.

Actuator 45 is operated to retract head 46 and the package is stepped to position l for marking. The actuator is then operated to extend head 46 so that the following jointed package may be tested while a defective package may be marked at the same time. To accommodate the time for stepping a package from position k to position l, a time delay circuit 56 is employed to delay the signal on conductors 54 and 55 for an interval that is substantially equal to the stepping time. An electrode magnetic device 57 includes an energizing coil 58 which is connected by way of conductors 59 and 60 to the output of time delay circuit 56. The electromagnetic device 57 further includes a movable member 61 and a marking member 62 extending through member 46 and positioned above a package occupying position l. Therefore, a package which is detected to be defective in position k is marked to indicate leakage at position l. Apparatus may also be provided at a downstream point to reject the defective packages in response to detection of leakage.

Attention is invited to FIG. 3 which schematically illustrates one form of delay circuit which may be connected between the gas detecting apparatus 53 and the energizing coil 58 of electromagnetic device 57. Delay circuit 56 comprises an amplifier 63 for amplifying the signal generated by the gas detecting apparatus. Amplifier 63 may include a pulse delay circuit or a pulse forming and stretching circuit as is well known in the art. The output from amplifier 63 is connected to a series of relays 64–65 for effecting the major portion of the delay interval. The relay chain may take the form of a plurality of relays which are individually operated in a stepped sequence, as illustrated in FIG. 3, or may take the form of any of a number of well known relay counting chains, including reflex counting chains in which any single relay may be operated a number of times. The relays may have their operate and restore characteristics modified by "slugging" techniques which are also well known in the art to extend their operation and restoration periods. The primary criterion for the circuit, however, is that the total time delay for the entire circuit is equal to travel time between positions $k$ and $l$.

Another requirement when using relay chains wherein operation of one relay depends upon previous operation of another relay is that a signal for operation of the relay be present for a sufficient time to effect operation thereof to effect extension of similar signal to the next relay in line. In FIG. 3, relay 64 is operated by the output signal from amplifier 63 to close its contacts 64a and 64b. Contact 64a has been further referenced with as contact 64ax to denote that this contact is an $x$ contact and as is well known in the relay art is the first to operate in the contact pileup to insure operation of relay 64 since amplifier 63 and probe 53 do not provide a sustained signal for a time sufficient to operate relay 64. Contact 64ax provides an energizing potential to relay 64 from potential V to ground through contacts 65c and 64ax. Contact 64b is then fully operated to extend a ground signal to the following relay, which in this instance is to relay 65 via contact 58a.

In a similar manner, relay 65 begins to operate over the circuit just provided and pulls its $x$ contact 65ax for full operation. Operation of relay 65 opens contact 65c to remove operating power from relay 64 and relay 64 restores. Relay 64 will not reoperate upon release of relay 65 since an input signal is no longer available from the output of amplifier 63 in that the defective package is in transit to position $l$. Operation of relay 65 also closes contact 65b to extend an operating ground to the winding 58 of the electromagnetic marking device 57. Operation of the electromagnetic device is, however, only momentary in that the electromagnetic device 57 is provided with a $y$ contact, contact 58ay which, as is also well known in the relay art, designates the contact or element which is last to operate in an electromagnetic relay structure. In the foregoing manner then, the marking member 62 of electromagnetic device 67 may be momentarily operated to mark the defective package which has in the interim come to rest at position 1.

The circuitry of FIG. 3 is not the only apparatus which may be employed to provide the required time delay. Amplifier 63 may be replaced by a circuit which operates to provide a trigger pulse and relays 64–65 may be replaced by a plurality of multivibrator circuits, particularly monostable or one-shot multivibrators. Also, a small motor having a speed that is similar to the indexing speed of package travel from position may be connected to receive energizing signal from relay 64, sustain that signal and provide the operating signal to winding 58, the electromagnetic device 57 then providing for removal of the sustained operating signal to the motor. In addition, many other time delay devices are available which may be employed in the place of the apparatus specifically illustrated in FIG. 3.

Located between positions $l$ and $m$, and extending transversely of the packaging machine, is a knife 66 which is connected to an extensible member 67 of an actuator 68. While the packages are at rest in position $l$ and $m$, the forward most package is separated from the serially connected train of packages by operation of actuator 68 which extends and withdraws member 67 and knife 66. The packages are then stepped through a plurality of positions which no further processing occurs until the packages reach position $r$ whereupon lever apparatus 69 is operated to release clamps 20 in a similar manner that apparatus 70 engaged clamps 20 after the web 12 passed below the idler roller 15.

At position $r$ suction apparatus 71 is momentarily operated to withdraw the packages from the trays 17 and place them on conveyor apparatus 72. Up until this time the packages have been severed only by knife 66 extending transversely of the machine to separate the packages longitudinally of the machine; however, as previously mentioned, the packaging machine may be constructed to provide a series of packages transversely thereof (only two across being shown in FIGS. 2, 4 and 5) and may require further separation. Therefore, a pair of rotating wheel-type knives 73 and 74 are provided to sever (or serrate) the material between transversely adjacent packages. Defective marked packages may then be optically detected and diverted for repackaging.

The foregoing description and the drawings are directed to separation of the packages after the individual, but connected, packages have been inspected for leakage; however, alternative techniques may be employed with respect to separation of the packages. One of these would be to sever the transverse side connected rows of packages before moving the individual packages of a row into the leak detector, Another alternative would be to totally sever the space between the packages both transversely and longitudinally of the machine and to thereby present completely separated individual packages to the leak detection chamber. Either of these alternatives would of course require repositioning of, or addition to, the cutting apparatus 66, 73 and 74.

The testing station may be realized by alternative constructions. With reference specifically to FIGS. 4 and 5 for example, a pressure testing condition is shown as comprising an actuator 80 having a head 82 connected to the end of an extensible piston 81. Head 82 is cup-shaped to form a chamber 83 therein for receiving a plurality of packages 84–87 therein to be tested for leaks. The head 82 includes a downwardly extending sealing edge 88 to totally encompass the perimeter of the strip (the strip may actually be greater than 2 units wide) to seal the strip so that a pressure (vacuum) cam be applied to the total strip. A resilient porous pad is attached to the roof of the chamber 83 to apply pressure by mechanical contact to the package to force the preservative atmosphere out of any leaks or cracks in the packages. These techniques provide that a package is fully tested at its upper surface as well as its lower surface which would be lodged within the cavity of the associated forming tray.

Also it will be appreciated that in some instances the mechanical pressure may be sufficient for testing leakage and external pressure sources may not be necessary.

Apparatus for marking defective packages has not been shown in FIGS. 4 and 5. Marking apparatus, or if desired apparatus for removing or rejecting defective packages, would, of course, be provided downstream from the testing station. One technique for rejecting defective packages is illustrated in FIG. 11 and includes the probe 53 operably connected to a reject mechanism 112 by way of a delay circuit 111, the delay circuit may be constructed in a manner similar to the one illustrated in FIG. 3. The reject mechanism 112 includes an extensible member 113 for a pusher 114 mounted at the end thereof for moving packages 110 transversely of the direction of travel of the conveyor 72. The defective packages may be directed for further packaging steps by a reject conveying apparatus, here illustrated as a reject chute 116 which feeds a reject conveyor 117. In this manner defective packages, referenced 110b, are separated from the good packages references 110a.

Another rejection technique is illustrated in FIG. 12 as comprising a conveyor 121 from receiving packages 110 upside down from a conveyor 72. Of course, turn over of the packages is only required if the mark is placed on the upper surface at position l; marking on the side would not necessitate a turn over mechanism, only appropriate positioning of the mark sensing apparatus which is to be described. This will place any lacking indicative of defective package on the upper surface of the package as it travels along at conveyor 121. A light source 118 connected to a suitable electrical 119 is positioned to scan the upper surfaces 110 and a photo cell 120 is positioned to scan further defective marks. The photo cell 120 is connected to a reject apparatus 112 through a delay circuit 111, as was the case with the apparatus of FIG. 11. Defective packages will be rejected to the reject chute 116 upon detection of the photo cell 120.

Referring for a moment specifically to FIGS. 6–8 the various pressure source, head and sensing apparatus relationships are schematically illustrated. In FIG. 6, a head 91 is connected by means of a fluid conduit to a sensor 93. Conduit 92 could also be realized as a gas probe of the aforementioned type. FIG. 7 illustrates that a source of gas or air pressure 95 may be connected in fluid communication with a head 91 by means of a conduit 94 and that a conduit 92 provides communication between head 91 and sensing apparatus 93. FIG. 8 illustrates that a head 91 may be connected to a sensor 93 through the medium of a vacuum source 97 and fluid conduits 96 and 98.

Packages which have been tested and are determined to be free of defects are further processed and packaged prior to shipment. During further processing or packaging, the packages may have their seals inadvertently weakened, or even ruptured, which operates to decrease or negate the effectiveness of the prior testing procedure. For example, one of the conventional labelling techniques employs the use of heat to seal labels to packages, establishing the possibility that the packages may become burned or melted to an extent that they are weakened and will subsequently rupture. In addition, inadvertent scuffing or abrasion of the packages may also be effective to make the seal defective. FIG. 9 illustrates, by means of the flow chart, steps which may be taken to insure the integrity of packages before shipping. Step 99 includes all previous steps to provide sealed and tested packages for shipping, the packages then being processed by other handling, referenced 100, including labelling and transporting of the packages to a station where they are partially packaged in an overwrapped container, reference step 101. The contents of the overwrapped container undergo a mutual pressure test, referenced step 102, similar to that hereinbefore described but this time including all packages of the overwrapped container, prior to sealing of the overwrapped container at step 103. Leaks in packages at this time causes diversion of the overwrap container for individual testing of packages.

FIG. 10 illustrates a gas diagram and flow chart relating to the gas operations of the present invention. Referring to FIG. 1 and 10 together, one may best understand the the formed packages are evacuated by step 107 (position i) and are then filled with a preservative atmosphere at step 108 (also position 10 prior to being tested for leaks at step 109 (position k); however, the preservative atmosphere may contain more than a single gas in order to provide both preservative of the package contents and detection of leakage of the preservative atmosphere. In such a case, a tracer gas such as octafluorocyclobutane or chloropentafluorethane, is provided with a preservative such as $CO_2$ gas as a vehicle; the gases are blended at step 106 and the gas mixture is provided for gas filling step 108. For the present illustration wherein octafluorocyclogutane is employed as the tracer gas and extremely sensitive apparatus for detecting the tracer gas is employed as hereinabove described, it is advantageous to provide vent apparatus in the form of a T coupling at the connection of the sensor to the fluid conduit so that the input to the sensor may be cleared upon each operation of the pressure apparatus.

Although minor modifications might be suggested by those versed in the art, it should be understood that I wish to embody within the scope of patent warranted hereon all such modifications as reasonably and properly come within the scope of my contribution to the art.

I claim:

1. A packaging apparatus comprising:
   means for transporting a first sheet of packaging material along a first path,
   means disposed along said first path for forming trays in the packaging material for receiving a product,
   means for transporting a second sheet of packaging material along a second path including a portion parallel to the first path,
   first sealing means for sealing the first and second sheets of material together around the periphery of each of said trays, said first sealing means leaving an unsealed portion in the periphery of each of said trays to form partially sealed packages,
   means for evacuating the partially sealed packages,
   means for injecting a selected gas into the partially sealed packages,
   second sealing means for sealing the unsealed portions of said packages to prevent escape of said selected gas,
   means disposed along said first path and downstream of said second sealing means for providing a pressure external of the sealed packages which is at a variance with the internal pressure of the packages, including detecting means operable to generate a leak detection signal upon detection of the selected gas, and indicating means disposed adjacent said first path and connected to said detecting means and operated by a leak detection signal to indicate a defective package, said indicating means including means for removing defective packages from said first path in response to a leak detection signal.

2. In a packaging machine of the type wherein a train of packages is formed between sheets of sealable material as the sheets are stepped along a packaging line and wherein a product is sealed in a preservative gas within each of the packages, the improvement comprising testing means on the packaging line for testing the integrity of the gas-filled packages as the train of packages is stepped therethrough, said testing means comprising means for providing a pressure external of a package that is different from the internal pressure of a package including means operable to contact and squeeze package, sensing means for sensing presence of said preservative gas external of said package and means for rejecting defective packages in response to the detection of said preservative gas.

3. In a packaging machine of the type wherein a train of packages is formed between sheets of sealable material as the sheets are stepped along a packaging line and wherein a product is sealed in a preservative gas within each of the packages, the improvement comprising testing means on the packaging line for testing the integrity of the gas-filled packages as the train of packages is stepped therethrough, said testing means comprising means for providing a pressure external of a package that is different from the internal pressure of a package including a source of gas at a pressure for application to the exterior of a package, sensing means for sensing presence of said preservative gas external of said package and means for rejecting defective packages in response to the detecting of said preservative gas.

4. In a packaging machine according to claim 3, wherein said source of gas includes a vacuum source.

5. In a packaging machine according to claim 2, wherein said means for rejecting defective packages includes means for marking defective packages in response to the detection of said preservative gas.

6. In a packaging machine according to claim 5, wherein said sensing means and said marking means are spaced-apart on said line, and said testing means further includes delay means interposed between said sensing and marking means to delay the operation of said marking means to accommodate package travel time between said sensing means and said marking means.

7. Apparatus for inspecting a plurality of serially-connected packages for leaks as said packages are moved in sequence along a line comprising:
means for providing a selected atmosphere within each of said packages at a first position on said line including means for sealing the individual packages to prevent escape of the selected atmosphere;
means for providing an enviroment for a package wherein the pressure external of the package is at a variance with the internal pressure of the package at a second position on the line;
means for sensing for the presence of said selected atmosphere external of the package that is within said environment; and
means for removing defective packages from the line in response to the sensing of said selected atmosphere, said sensing means including means for marking a defective package and said means for removing packages including means responsive to a mark on a package to generate a signal, and a reject mechanism operable in response to said signal.

8. Apparatus for inspecting sealed packages which have an internal atmosphere of a selected gas and which are moved as a serial train of packages, said apparatus comprising:
means for moving said packages in a line along a path,
means forming a chamber for receiving said joined packages individually in sequence as they are moved along said path, said means forming said chamber including means forming a second chamber down-stream of the first mentioned chamber for receiving individual ones of said joined packages in sequence,
means for pressurizing the first-mentioned chamber while it contains a package to a pressure that is at a variance with the internal marking of the package,
means within the first-mentioned chamber for detecting the presence of the selected gas external of the packages, and
means connected to and operated by said detecting means to reject leaky packages, said reject means including marking means having a movable marking member within said second chamber, and delay means connected between said detecting means and said marking means for delaying operation of said marking means for a time sufficient to permit travel of a defective package from the first-mentioned chamber to said second chamber.

9. Apparatus for inspecting sealed packages which have an internal atmosphere of a selected gas and which are moved as a serial train of packages, said apparatus comprising:
means for moving said packages in a line along a path,
means forming a chamber for receiving said joined packages individually in sequence as they are moved along said path,
means for pressurizing said chamber while it contains a package to a pressure that is at a variance with the internal pressure of the package,
means within said chamber for detecting the presence of the selected gas external of the packages,
means connected to and operated by said detecting means to reject leaky packages, said reject means including marking means disposed downstream of said chamber at a marking station for receiving said joined packages in sequence, and
delay means connected between said detecting means and said marking means for delaying operation of said marking means for an interval sufficient to permit a package to be moved from said chamber to said marking station.

10. The apparatus according to claim 9, wherein said reject means comprises a reject mechanism and photoelectric scanning means for scanning the packages for marks and operable in response to the detection of a mark to operate said reject mechanism.

* * * * *